(12) United States Patent
Sengupta et al.

(10) Patent No.: US 12,513,195 B2
(45) Date of Patent: Dec. 30, 2025

(54) SECURE CROSS-TENANT ACCESS

(71) Applicant: Microsoft Technology Licensing, LLC, Redmond, WA (US)

(72) Inventors: Sucharit Sengupta, Bothell, WA (US); Gaurav Raghu Dhawan, Seattle, WA (US); Prasanna Chromepet Padmanabhan, Redmond, WA (US); Amar Dinesh Zavery, Redmond, WA (US); Artem Rudoy, Woodinville, WA (US); Kenneth Uchechukwuka Oyibo, Seattle, WA (US); Derek Xianyang Liu, Issaquah, WA (US); Prakash Narayanan, Redmond, WA (US); Rajesh Dadhia, Bellevue, WA (US); Ramachandra Ravitej Vennapusa, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 18/328,089

(22) Filed: Jun. 2, 2023

(65) Prior Publication Data

US 2024/0406213 A1    Dec. 5, 2024

Related U.S. Application Data

(60) Provisional application No. 63/469,935, filed on May 31, 2023.

(51) Int. Cl.
*H04L 9/40* (2022.01)
(52) U.S. Cl.
CPC .......... *H04L 63/20* (2013.01); *H04L 63/0236* (2013.01); *H04L 63/0876* (2013.01); *H04L 63/105* (2013.01)

(58) Field of Classification Search
CPC . H04L 63/20; H04L 63/0236; H04L 63/0876; H04L 63/105
(Continued)

(56) References Cited

U.S. PATENT DOCUMENTS

| 11,716,312 B1* | 8/2023 | McNamara, Jr. ....... G06F 21/46 726/6 |
| 2016/0277411 A1 | 9/2016 | Dani et al. |
| 2023/0164182 A1* | 5/2023 | Kothari ............... H04L 63/1416 726/23 |

OTHER PUBLICATIONS

International Search Report and Written Opinion received for PCT Application No. PCT/US2024/030151, Aug. 28, 2024, 12 pages.

(Continued)

*Primary Examiner* — Anthony D Brown
(74) *Attorney, Agent, or Firm* — Rainier Patents, P.S.

(57) ABSTRACT

In a cloud computing environment, a cross-tenant access security measure includes monitoring conditional access policies for changes or additions that hamper or threaten to hamper an authorized access from an assistant tenant user to a focus tenant. In some cases, cross-tenant access security includes tracking a role assignment list to detect rogue roles, or to detect hampering role changes such as role deletions, or both. In some cases, focus tenant events and assistant tenant events are correlated in an audit. In some cases, the authorized access is a zero standing time bound access. In some cases, the authorized access is constrained to an IP address range, or constrained to login from a managed device, or both. In short, security measures are described that mitigate accidental or surreptitious role or policy changes that would shut down or hinder authorized cross-tenant access.

20 Claims, 3 Drawing Sheets

(58) Field of Classification Search
USPC .......................................................... 726/1
See application file for complete search history.

(56) References Cited

OTHER PUBLICATIONS

Kamra, et al., "Design and Implementation of an Intrusion Response System for Relational Databases", Transactions on Knowledge and Data Engineering, vol. 23, Issue No. 6, Jun. 1, 2011, pp. 875-888.

Vasil Michev, "Cross-tenant access policy (XTAP) and the Graph API", retrieved from << https://www.michev.info/blog/post/3681/cross-tenant-access-policy-xtap-and-the-graph-api >>, Posted onFeb. 10, 2022, 12 pages.

"View applied Conditional Access policies in Azure AD sign-in logs", retrieved from << https://learn.microsoft.com/en-us/azure/active-directory/reports-monitoring/how-to-view-applied-conditional-access-policies >>, Feb. 2, 2023, 3 pages.

Abhishek Kumar, "Enforcing Zero Standing Access", retrieved from << https://query.prod.cms.rt.microsoft.com/cms/api/am/binary/RE2CIzC >>, Sep. 24, 2018, 8 pages.

"Microsoft Defender Experts for Hunting", retrieved from << https://learn.microsoft.com/en-us/microsoft-365/security/defender/defender-experts-for-hunting?view=o365-worldwide >>, Mar. 6, 2023, 2 pages.

"Microsoft Security Experts", retrieved from << https://www.microsoft.com/en-us/security/business/services/ >>, no later than May 2, 2023, 5 pages.

Vasu Jakkal, "Building a safer world together with our partners—introducing Microsoft Security Experts", retrieved from << https://www.microsoft.com/en-us/security/blog/2022/05/09/building-a-safer-world-together-with-our-partners-introducing-microsoft-security-experts/ >>, May 9, 2022, 16 pages.

"Microsoft Defender Experts for Hunting proactively hunts threats", retrieved from << https://www.microsoft.com/en-us/security/blog/2022/08/03/microsoft-defender-experts-for-hunting-proactively-hunts-threats/ >>, Aug. 3, 2022, 10 pages.

"Create device security policies in Basic Mobility and Security", retrieved from << https://learn.microsoft.com/en-us/microsoft-365/admin/basic-mobility-security/create-device-security-policies?view=o365-worldwide >>, Feb. 16, 2023, 8 pages.

"Audit logging and monitoring overview", retrieved from << https://learn.microsoft.com/en-us/compliance/assurance/assurance-audit-logging >>, Apr. 3, 2023, 7 pages.

"Overview: Cross-tenant access with Azure AD External Identities", retrieved from << https://learn.microsoft.com/en-us/azure/active-directory/external-identities/cross-tenant-access-overview >>, Mar. 15, 2023, 12 pages.

"Introduction to granular delegated admin privileges (GDAP)", retrieved from << https://learn.microsoft.com/en-us/partner-center/gdap-introduction >>, Mar. 21, 2023, 2 pages.

"Use the What If tool to troubleshoot Conditional Access policies", retrieved from << https://learn.microsoft.com/en-us/azure/active-directory/conditional-access/what-if-tool >>, Mar. 15, 2023, 4 pages.

"Microsoft Intune securely manages identities, manages apps, and manages devices", retrieved from << https://learn.microsoft.com/en-us/mem/intune/fundamentals/what-is-intune >>, Apr. 2, 2023, 11 pages.

"Application as Filed in U.S. Appl. No. 17/820,617", filed Aug. 18, 2022, 46 Pages.

"Application as Filed in U.S. Appl. No. 17/835,050", filed Jun. 8, 2022, 70 Pages.

* cited by examiner

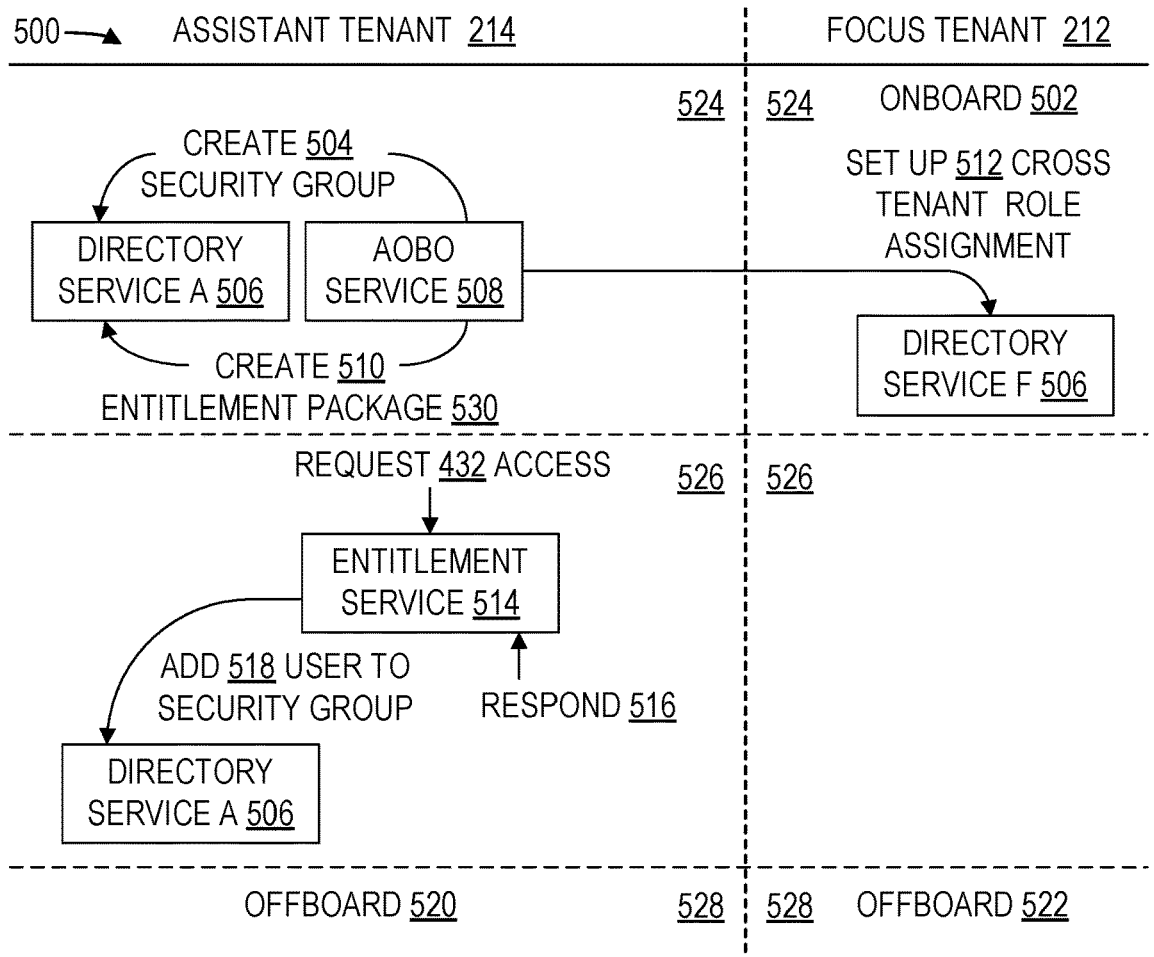

SECURE CROSS-TENANT ACCESS

RELATED APPLICATION

The present application claims priority to, and incorporates by reference the entirety of, U.S. provisional patent application No. 63/469,935 filed 31 May 2023.

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, able to determine the scope of an attack or vulnerability, or able to end every detected cyberattack. But sometimes combining and layering a sufficient number and variety of defenses and investigative tools will prevent an attack, deter an attacker, or at least help limit the scope of harm from an attack or a vulnerability.

To implement defense in depth, cybersecurity professionals consider the different kinds of attacks that could be made against a computing system, and the different vulnerabilities the system may include. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place or removing a particular vulnerability to attack. They investigate the scope of an attack, and try to detect vulnerabilities before they are exploited in an attack. Some defenses or investigations might not be feasible or cost-effective for the particular computing system. However, improvements in cybersecurity remain possible, and worth pursuing.

SUMMARY

Some embodiments address technical challenges raised by the prospect of authorizing a user in one cloud computing tenant to command a performance of operations in another cloud computing tenant. A secure cross-tenant access raises challenges such as how to technologically constrain the access to an authorized scope and how to technologically prevent or mitigate attempts to hamper the authorized access, for example. Sometimes the operations performed relate to cybersecurity, such as operations to reduce an attack surface, remove a security vulnerability, or investigate a security incident, among others. However, teachings herein are not limited to cross-tenant cybersecurity operations.

In some embodiments, a computing system is configured for secure cross-tenant access. The system includes a processor set in operable communication with a digital memory. The processor set is configured to execute a secure cross-tenant access method which includes at least one of: detecting a conditional access policy hampering change and alerting in response to said conditional access policy hampering change detection, detecting a hampering conditional access policy addition and alerting in response to said hampering conditional access policy addition detection, or detecting a cross tenant role assignment hampering change and alerting in response to said cross tenant role assignment hampering change detection. Some embodiment variations omit one of the detecting steps. The terms "cross tenant" and "cross-tenant" are used interchangeably herein.

Unless stated otherwise, in all examples a conditional access policy hampering change is a change which hampers an authorized access to a focus tenant by a user from an assistant tenant, a hampering conditional access policy addition is an addition of a conditional access policy which hampers the authorized access to the focus tenant by the user from the assistant tenant, and a cross tenant role assignment hampering change is a change which hampers the authorized access to the focus tenant by the user from the assistant tenant. Here, as elsewhere herein, "by a user" means by a user device, or by a user account, or by software on behalf of a user, or by hardware on behalf of a user. Also, as elsewhere herein, authorized access to the focus tenant by the user from the assistant tenant is also referred to more concisely as "authorized access to the focus tenant from the assistant tenant".

In all examples, unless stated otherwise, "hampering" means blocking, slowing down, encumbering, hindering, or obstructing.

Herein, access or any other activity by a user refers to activity by a user device, or by a user account, or by software on behalf of a user, or by hardware on behalf of a user. Activity is represented by digital data or machine operations or both in a computing system. Activity by a user referenced within the scope of any claim based on the present disclosure excludes human actions per se, and thus does not bring human behavior per se within the scope of any embodiment or any claim.

In some embodiments, a cybersecurity method for secure cross-tenant access includes monitoring a non-hampering conditional access policy of a focus tenant. The monitoring includes checking for a hampering change in the non-hampering conditional access policy, and checking for an addition of a hampering conditional access policy. This cybersecurity method also includes tracking a cross tenant role assignment of the focus tenant. The tracking includes inspecting the cross tenant role assignment for a change in the cross tenant role assignment.

This example cybersecurity method also includes detecting at least one of: the hampering change in the non-hampering conditional access policy, the addition of the hampering conditional access policy, or the change in the cross tenant role assignment.

Some cybersecurity method embodiments also include modifying at least one of the following in response to a result of the detecting: the non-hampering conditional access policy, the hampering conditional access policy, the cross tenant role assignment, or a scope of the authorized access to the focus tenant by the user from the assistant tenant.

In some embodiments, a computer-readable storage device is configured with data and instructions which upon execution by a processor cause a computing system to perform a secure cross-tenant access method. This method includes at least one of: alerting in response to a detection of a conditional access policy hampering change, alerting in response to a detection of a hampering conditional access policy addition, or alerting in response to a detection of a cross tenant role assignment hampering change. Some embodiment variations omit one of the alerting steps.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 4 is a block diagram illustrating some additional aspects of tenants;

FIG. 5 is a data flow diagram illustrating aspects of some SCTA functionality;

DETAILED DESCRIPTION

Overview

Figure 1:
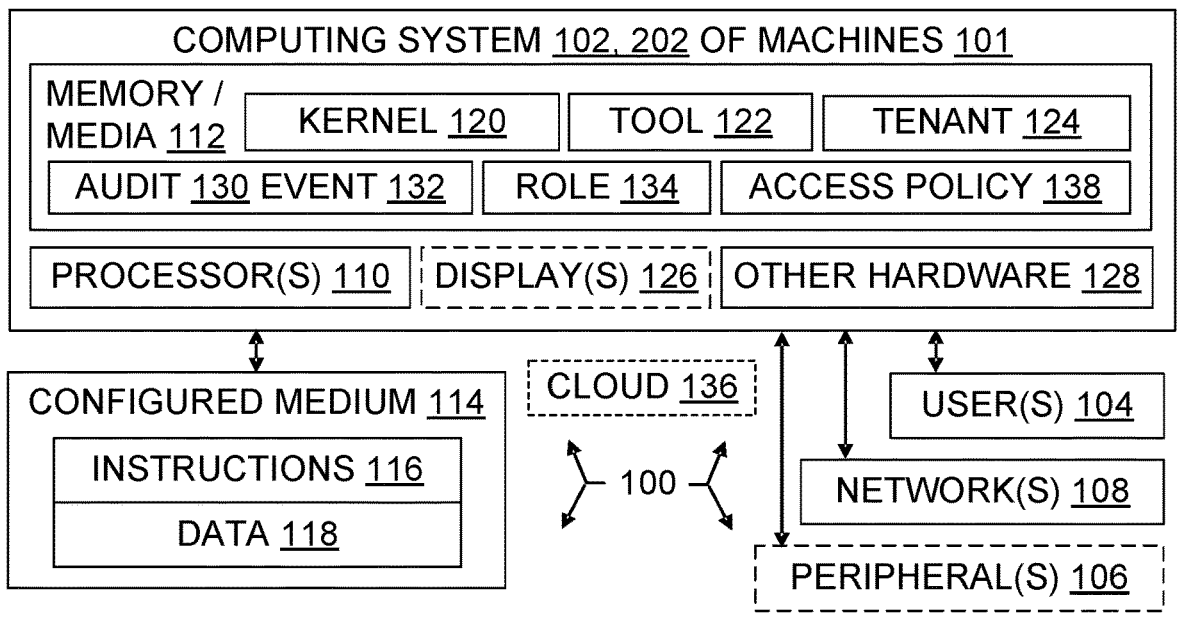
FIG. 1 is a diagram illustrating aspects of computer systems and also illustrating configured storage media, including some aspects generally suitable for systems which provide secure cross-tenant access (SCTA) functionality.

Some teachings described herein were motivated by technical challenges faced during efforts to improve technology for allowing cybersecurity experts to perform security operations in computing systems. In particular, challenges were faced during efforts to safely improve access by managed services personas like technicians, security operators, and information technology operators to let them login into a customer tenant to solve and remediate issues in the customer tenant while keeping the customer's environment safe and secure.

A multi-tenant cloud architecture allows multiple tenants to share computing resources in a public, hybrid, or private cloud. Tenants are cloud computing constructs at a level between users and the cloud overall. A given tenant typically has more than one user account. Cross-tenant access raises security concerns in many cloud computing environments, so a user in one tenant does not automatically or easily receive access to the user data, settings, hardware, applications, logs, and other resources in a different tenant. One security concern is that the access could be expanded beyond the authorized scope, and another security concern is that the access could shut down or hindered despite being authorized. These and other concerns were motivations for some of the present disclosure, but teachings herein are not limited in their scope or applicability to particular motivational challenges.

Some embodiments described herein utilize or provide a cybersecurity method for secure cross-tenant access, including monitoring a non-hampering conditional access policy of a focus tenant, the monitoring including checking for a hampering change in the non-hampering conditional access policy, the monitoring also including checking for an addition of a hampering conditional access policy, wherein the hampering change is a change which hampers an authorized access to the focus tenant by a user from an assistant tenant, and the hampering conditional access policy is a conditional access policy which hampers the authorized access to the focus tenant by the user from the assistant tenant.

In these embodiments, this policy monitoring functionality has the technical benefit of mitigating accidental or surreptitious policy changes that would shut down or hinder authorized cross-tenant access. In some scenarios, the assistant tenant user activity is controlled by a security expert who works for a cloud service provider, the focus tenant is a customer tenant of the cloud service provider, and the cross-tenant access is authorized by a customer admin in order to improve the customer tenant's security or investigate a security incident in the customer tenant, or do both. The policy monitoring functionality makes it more difficult for an attacker to use access policy changes to stop the customer tenant from receiving expert security assistance.

Some embodiments described herein utilize or provide a cybersecurity method for secure cross-tenant access, including tracking a cross tenant role assignment of the focus tenant, the tracking including inspecting the cross tenant role assignment for a change in the cross tenant role assignment. This role monitoring functionality has the technical benefit of mitigating accidental or surreptitious role changes that would shut down or hinder authorized cross-tenant access. Moreover, in some embodiments the tracking includes detecting a rogue role. The authorized cross tenant access is not necessarily hampered by the rogue role, but an attacker has leveraged that authorized access to surreptitiously add an additional role that was not agreed to by the customer. If this rogue role is not detected, it can be used later by the attacker to maliciously access the customer tenant.

Some embodiments described herein utilize or provide a cybersecurity method for secure cross-tenant access, including correlating a focus tenant audit with an assistant tenant audit, thereby producing a correlated audit of activity of the user in the focus tenant and activity of the user in the assistant tenant. This audit correlation functionality has the technical benefit of permitting detection of deviations by the assistant tenant user from the set of operations authorized by the customer, and also has the technical benefit of showing that the assistant tenant user did or did not perform particular operations.

For example, in some scenarios a customer tenant admin approves an access by a security investigator with the caveat that the access is limited to investigating an incident and no changes will be made in the customer tenant security controls by the investigator during the access. Correlating audits ties together the security investigator's request for access, the admin's response granting access with the no-changes caveat, the security investigator's login to the customer tenant and activities during the access, the security investigator's logout from the customer tenant, and the subsequent teardown of the access grant. Correlated audits are thus useful to answer questions such as whether the security investigator changed any security controls, how the admin described the purpose of the access grant, and whether the security investigator was logged in at the time a security control was changed if the security control change is not shown in the logs.

Some embodiments described herein utilize or provide a cybersecurity method for secure cross-tenant access, including receiving in the focus tenant a command from the user, wherein the command is in at least one of the following command categories: security investigation commands, security modification commands, or managed service commands. This command functionality has the technical benefit of expanding secure cross tenant to include any managed service commands, in addition to security commands or instead of security commands. For example, secure access may be granted to a government regulator, to a court-appointed expert, to SaaS vendor, or to a vetted consultant in order to install or performance tune a particular service.

Some embodiments described herein utilize or provide a cybersecurity method for secure cross-tenant access, including receiving constraining the authorized access to the focus tenant by the user from the assistant tenant to be access only via login from an authorized managed device. In addition, or instead, some embodiments constrain the authorized access to the focus tenant by the user from the assistant tenant to be access only via login from a specific IP address range. This access constraint functionality has the technical benefit of making the authorized cross tenant access even more secure. In some embodiments, it is an optional supplement to, not a replacement for, the monitoring, tracking, detecting, alerting, and other functionalities described herein.

These and other benefits are not limited to method embodiments, and they will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 328 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one or more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, secure cross-tenant access functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

Figure 2:
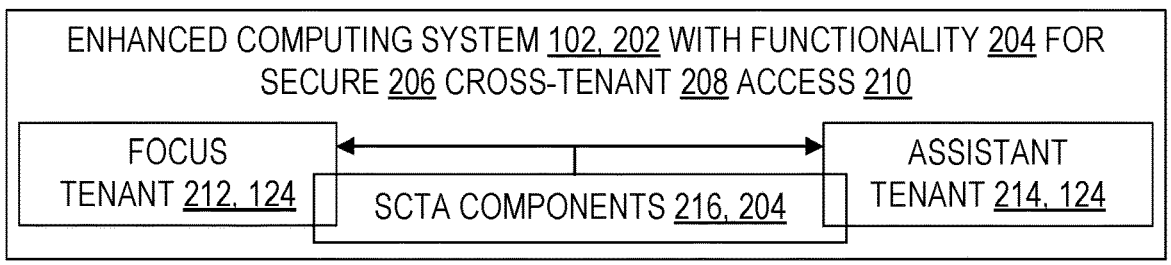
FIG. 2 is a block diagram illustrating an enhanced system configured with an SCTA functionality.

FIG. 2 illustrates a computing system 102 configured by one or more of the secure cross-tenant access enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
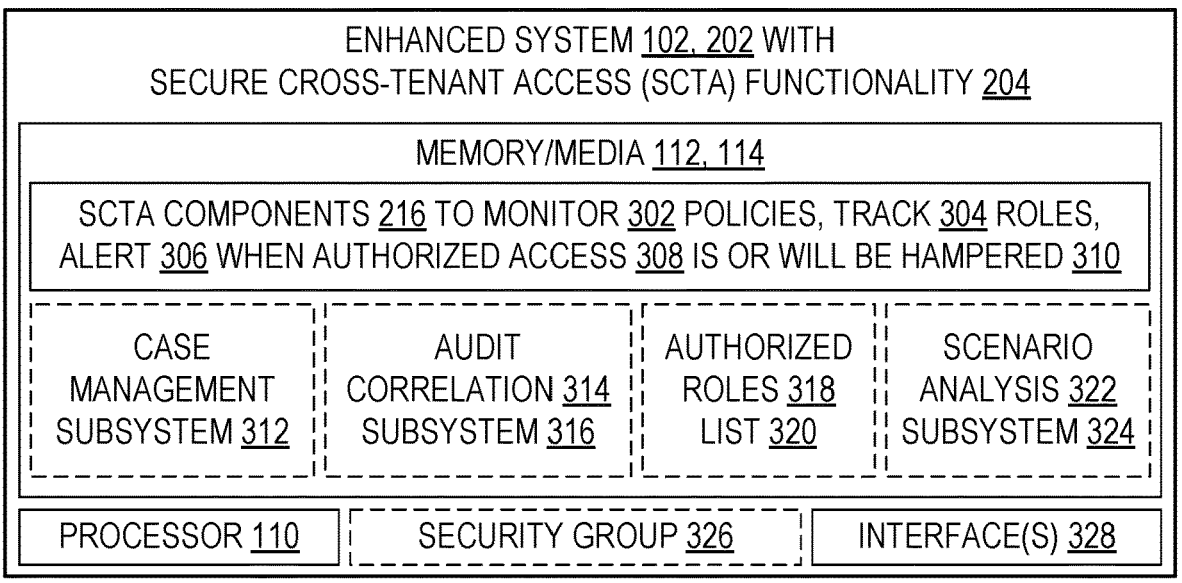
FIG. 3 is a block diagram illustrating aspects of a system enhanced with an SCTA functionality.

FIG. 3 shows some aspects of some enhanced systems 202. This is not a comprehensive summary of all aspects of enhanced systems 202 or all aspects of secure cross-tenant access functionality 204. Nor is this Figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some additional aspects of cloud tenants 124. This is not a comprehensive summary of all additional aspects of tenants 124 or clouds 136. FIG. 4 items are discussed at various points herein, and additional details regarding them are provided in the discussion of a List of Reference Numerals later in this disclosure document.

FIG. 5 shows some aspects of data flow to, from, or between items that include directory services 506, an entitlement service 514, and an AOBO (action on behalf of, a.k.a. administrate on behalf of) service 508. This is not a comprehensive summary of all additional aspects of assistant tenants 214, 124 or focus tenants 212, 124 or clouds 136. FIG. 5 items are discussed at various points herein, and additional details regarding them are provided in the discussion of a List of Reference Numerals later in this disclosure document.

Figure 6:
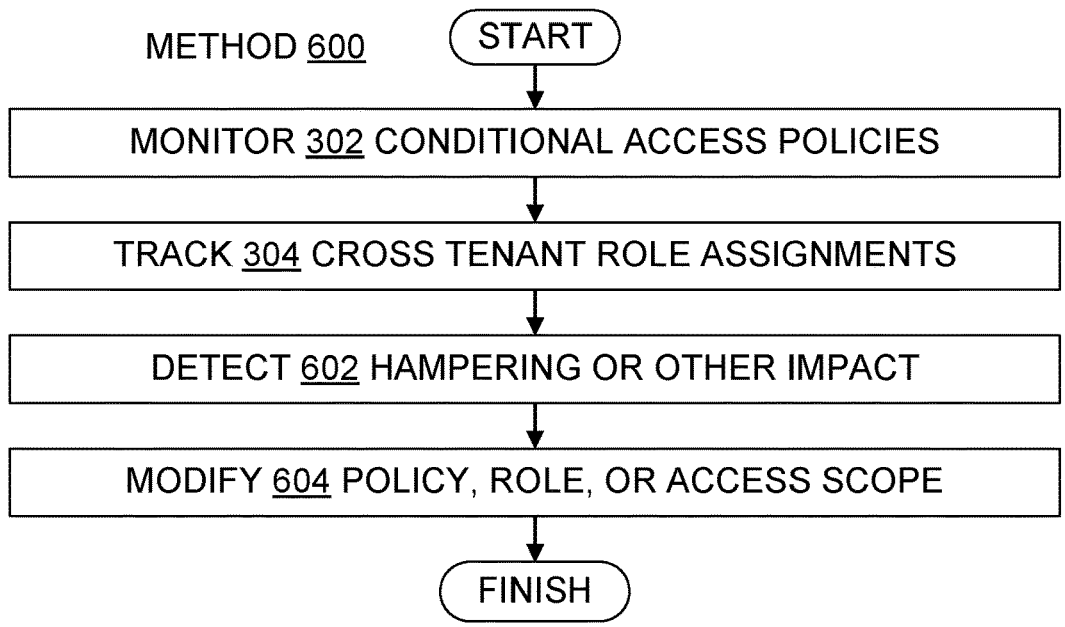
FIG. 6 is a flowchart illustrating steps in a secure cross-tenant access method.
Figure 7:
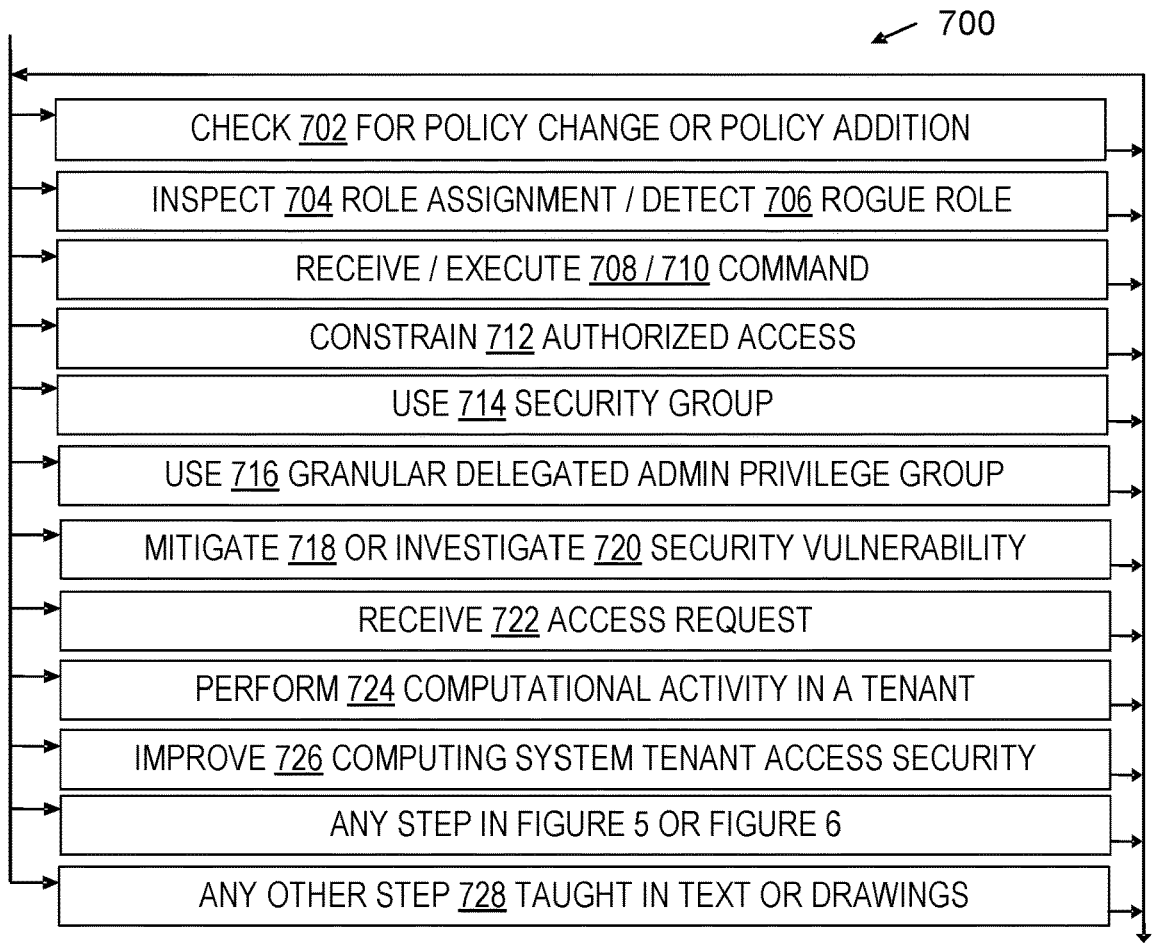
FIG. 7 is a flowchart further illustrating steps in some secure cross-tenant access methods, and incorporating FIGS. 6 and 5.

The other figures are also relevant to systems 202. Along with FIG. 5, FIGS. 6 and 7 illustrate methods of functionality 204 operation in systems 202.

In some embodiments, the enhanced system 202 is networked through an interface 328. In some, an interface 328 includes hardware such as network interface cards, software such as network stacks, APIs, or sockets, combination items such as network connections, or a combination thereof.

Some embodiments include a computing system 202 which is configured for secure cross-tenant access. The computing system includes: a digital memory 112, and a processor set 110 including at least one processor, the processor set in operable communication with the digital memory. The processor set is configured to execute a secure cross-tenant access method 700 which includes at least one of: detecting 602 a conditional access policy 402 hampering change 444 and alerting 306 in response to said conditional access policy hampering change detection, detecting 602 a hampering conditional access policy addition 446 and alerting 306 in response to said hampering conditional access policy addition detection, or detecting 602 a cross tenant role assignment 408 hampering change 444 and alerting 306 in response to said cross tenant role assignment hampering change detection. The conditional access policy hampering change is a change which hampers 310 an authorized access 308 to a focus tenant 212 by a user from an assistant tenant 214. The hampering conditional access policy addition is an addition of a conditional access policy which hampers 310 the authorized access to the focus tenant by the user from the assistant tenant. The cross tenant role assignment hampering change is a change which hampers 310 the authorized access to the focus tenant by the user from the assistant tenant.

Some embodiments include a case management subsystem 312 which resides in the assistant tenant and includes an interface 328 that is configured to receive 722 a request 432 for the authorized access to the focus tenant.

Some embodiments include an audit correlation subsystem 316 which is configured to upon execution correlate 314 an assistant tenant request 432 for the authorized access to the focus tenant with a focus tenant sign-in event 132 and with a focus tenant resource 438 access event 132.

In some embodiments, a list 320 of authorized roles 318, 134 resides in the digital memory, and detection 602 of a cross tenant role assignment hampering change includes detection of a different role 413, 134 which is not in the access-controlled list of authorized roles.

Some embodiments include a security group 326 which resides in the assistant tenant and corresponds 714 to a non-hampering cross tenant role assignment 408 in the focus tenant.

Some embodiments include a scenario analysis subsystem 324 which is configured to upon execution perform a scenario analysis 322 based on at least a conditional access policy scope 404 and an authorized access scope 436 of the authorized access 308 to the focus tenant 212.

Other system embodiments are also described herein, either directly or derivable as system versions of described processes or configured media, duly informed by the extensive discussion herein of computing hardware.

Although specific secure cross-tenant access architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of cross-tenant access functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5, 6, and 7 each illustrate a family of methods 500, 600, and 700 respectively, which are performed or assisted by some enhanced systems, such as some systems 202 or another secure cross-tenant access functionality enhanced system as taught herein. Method families 500 and 600 are each a proper subset of method family 700.

FIG. 5 shows three phases: an onboarding phase 524, an on-demand access phase 526, and an offboarding phase 528. Some variations on FIG. 5 include at most one of these phases, without necessarily excluding other steps not shown in FIG. 5. Some variations on FIG. 5 include at most two of these phases, without necessarily excluding other steps not shown in FIG. 5. Exclusion in this sense does not require non-performance; an excluded phase is sometimes performed by a different party, for example, and thus not included in a given embodiment. FIG. 5 items are discussed at various points herein, and additional details regarding them are provided in the discussion of a List of Reference Numerals later in this disclosure document.

Some variations on FIG. 6 exclude the monitoring step 302 or exclude the tracking step 304. Some variations include alerting 306 instead of modifying, and some include both alerting 306 and modifying 604. These are merely examples of variations; as noted elsewhere, any operable combination of steps that are disclosed herein may be part of a given embodiment.

FIGS. 1 to 5 illustrate secure cross-tenant access system 202 architectures with implicit or explicit actions, e.g., giving administrator consent, creating or providing or using or nullifying access tokens, reading and enforcing access policies, comparing role assignments, or otherwise processing data 118, in which the data 118 includes, e.g., security tokens, access policies 138, roles 134, security groups 326, access requests 423 and responses 516, and directory service 506 data, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types data in response to tool 122 execution or kernel 120 execution. But no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a cybersecurity method 700 for secure cross-tenant access method; the method is performed by a computing system 202. The method includes at least the following: monitoring 302 a non-hampering conditional access policy of a focus tenant, the monitoring including checking 702 for a hampering change 444 in the non-hampering conditional access policy, the monitoring also including checking 702 for an addition 446 of a hampering conditional access policy. The hampering change is a change which hampers 310 an authorized access to the focus tenant by a user from an assistant tenant. The hampering conditional access policy is a conditional access policy which hampers 310 the authorized access to the focus tenant by the user from the assistant tenant. In this example, the method also includes tracking 304 a cross tenant role assignment of the focus tenant, the tracking including inspecting 704 the cross tenant role assignment for a change in the cross tenant role assignment. In this example, the method also includes detecting 602 at least one of: the hampering change in the non-hampering conditional access policy, the addition of the hampering conditional access policy, or the change in the cross tenant role assignment. In this example, the method also includes modifying 604 at least one of the following in response to a result of the detecting: the non-hampering conditional access policy, the hampering conditional access policy, the cross tenant role assignment, or a scope of the authorized access to the focus tenant by the user from the assistant tenant.

In some embodiments, the method includes correlating 314 a focus tenant audit with an assistant tenant audit, thereby producing 314 a correlated audit 130 of activity 406 of the user in the focus tenant and activity 406 of the user in the assistant tenant.

In some embodiments, the method includes receiving 708 in the focus tenant a command 412 from the user, wherein the command is in at least one of the following command categories: security investigation commands 410, security modification commands 410, or managed service commands 418.

In some embodiments, monitoring 302 the non-hampering conditional access policy includes performing 322 a scenario analysis 322. In some embodiments, the scenario analysis includes a what-if analysis which is adapted from a tool 122 that identifies potential impact of a policy change without respect to cross-tenant access 308 scope 436.

In some embodiments, tracking 304 the cross tenant role assignment incudes detecting 706 a rogue role.

In some embodiments, the method includes constraining 712 the authorized access to the focus tenant by the user from the assistant tenant to be a zero standing 420 time bound 422 access 424. In some variations, the access 424 is constrained to zero standing but not constrained to time bound, or vice versa. Not constrained to time bound 422 does not imply perpetual; a non-time bound access can be terminated on demand by a command from an administrator.

In some embodiments, the method includes constraining 712 the authorized access to the focus tenant by the user from the assistant tenant to be access only via login from an authorized managed device 426. In some embodiments, the method includes constraining 712 the authorized access to the focus tenant by the user from the assistant tenant to be access only via login from a specific IP address range 442. In embodiment variations, none, one, two, or more of the following constraints 712 are enforced: zero standing, time bound, managed device, or IP address range.

In some embodiments, the method includes defining 716 the cross tenant role assignment in the focus tenant using 716 at least a granular delegated administrative privileges group 430.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as security groups 430, 326, directory service 506 data, services 508, 514, access requests 432 and responses 516, role assignments 408, access policies 138, audit events 132, subsystems 312, 316, 324, and SCTA software 216, in the form of data 118 and instructions 116, read from a removable storage medium 114 and/or another source such as a network connection, to form a configured storage medium. The configured storage medium 112 is capable of causing a computer system 202 to perform technical process steps for providing or utilizing SCTA functionality 204, as disclosed herein. The Figures thus help illustrate configured storage media embodiments and process (a.k.a. method) embodiments, as well as system and process embodiments. In particular, any of the method steps illustrated in FIG. 5, 6, or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a secure cross-tenant access method 700. This method 700 includes: alerting 306 in response to a detection 602 of a conditional access policy hampering change, alerting 306 in response to a detection 602 of a hampering conditional access policy addition, or alerting 306 in response to a detection 602 of a cross tenant role assignment hampering change, wherein the conditional access policy hampering change is a change which hampers an authorized access to a focus tenant by a user from an assistant tenant, the hampering conditional access policy addition is an addition of a conditional access policy which hampers the authorized access to the focus tenant by the user from the assistant tenant, and the cross tenant role assignment hampering change is a change which hampers the authorized access to the focus tenant by the user from the assistant tenant.

In some embodiments, the method further includes correlating 314 a focus tenant audit with an assistant tenant audit, thereby producing 314 a correlated audit of activity of the user in the focus tenant and activity of the user in the assistant tenant.

In some embodiments, the method further includes constraining 712 the authorized access to the focus tenant by the user from the assistant tenant to be a zero standing time bound access via login from an authorized managed device.

In some embodiments, the method further includes constraining 712 the authorized access to the focus tenant by the user from the assistant tenant to be a zero standing time bound access via login from a specific IP address range.

In some embodiments, the method further includes constraining 712 the authorized access to the focus tenant by the user from the assistant tenant to be access only via login from an authorized managed device and from a specific IP address range.

ADDITIONAL OBSERVATIONS

Additional support for the discussion of SCTA functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

In this disclosure, a customer tenant is an example of a focus tenant 212. The teachings are applicable to other focus tenants as well. For instance, in some scenarios there is a focus tenant that is not also a customer tenant, because no customer-provider business relationship exists between a focus tenant entity that is managing, operating, controlling, or owning the focus tenant and an assistant tenant entity that is managing, operating, controlling, or owning the assistant tenant.

Some embodiments provide or enhance a managed service technician's ability to act as an admin on behalf of a customer to mitigate incidents on the customer's tenant in a secure, compliant, auditable, and timely fashion. This ability helps keep the customer tenant and its assets secure.

Some embodiments provide or utilize an ability to monitor and alert any change to CA policy intended for the customer tenant that does not allow the authorized technician to log on to the customer's product portal.

Some embodiments provide or utilize an ability to monitor and alert in the event of a cross tenant role assignment expanding beyond the intended purposes.

Some embodiments provide or utilize an ability to provide correlated audits for all actions that the technician is involved across different systems. IN some this includes case management audit events, AAD or other directory service 506 sign-in logs, and product audit events.

Some embodiments provide or utilize an ability to request time-bound non standing access by security technicians within the context of a case management system. Some embodiments provide or utilize an ability to request time-bound standing access by security technicians within the context of a case management system.

Some embodiments provide or utilize an ability to provision time-bound cross tenant role assignment in the focus tenant.

Some embodiments provide or utilize an ability to reduce the attack surface by only allowing the technician to access the focus tenant from a secured and restricted device that is enrolled in the MEM of the assistant tenant.

Some embodiments provide or utilize an ability for technicians to log on to the customer's product portal and perform actions that enhance the security, reliability, performance, or usability of the customer's product.

Some embodiments provide or utilize an ability to provide correlated audits for all actions that the technician is involved across different systems. In some cases, these include case management audit events, directory service sign-in events, and product audit events.

Some embodiments provide or utilize an ability to monitor and alert on any changes to CA policy intended for the customer tenant that does not allow the technician to log on to the customer's product portal.

Some embodiments provide or utilize an ability to establish a trust model wherein a customer can consent to the creation of Cross Tenant Access policies and Conditional Access policies on their tenant.

Some embodiments provide or utilize an ability to expand the scope of approvers for technicians' time-bound non standing access, to be outside of the MSE tenant.

Some embodiments provide or utilize an ability to monitor and alert in the event of the Cross Tenant Role Assignment expanding beyond the intended purposes.

Some embodiments provide or utilize a case management subsystem, e.g., an enhanced Dynamics 365 Integrated Case Management System, to obtain non-standing access that leverages access management, e.g., AAD's Cross Tenant Access Management, in order to remediate security incidents and perform mitigation actions. Some of the many examples of remediation or mitigation include isolating a device, running an anti-virus scan, and retiring a device. In some embodiments, the authorized access includes activity on a security portal such as a MEM or MSE portal. Some embodiments use secured and restricted Windows 365® devices enrolled in Microsoft Endpoint Manager (MEM) of the Microsoft Experts (MSE) tenant (mark of Microsoft Corporation). Some embodiments also offer a capability to have correlated audits for all the actions that the technician will be involved in the aforementioned systems. Some embodiments also provide monitoring of Conditional Access (CA) policies in the customer tenant to prevent the customer or an intruder from blocking access to authorized technicians.

Some embodiments leverage or adapt Azure® AD sign-in security features such as an X-TAP policy trust setting wherein a customer tenant 212 trusts a compliant device 101 from an assistant tenant 214, an inbound Conditional Access to customer tenants with granular targeting (external user type and tenant scoping), and constraints that technicians access customer tenants via Windows 365® devices that are MEM enrolled in the assistant tenant 214. Some embodiments leverage or adapt Azure® AD Cross Tenant role assignments for authorization. Some embodiments leverage or adapt Azure® AD Entitlement Management (ELM) for technician Just-In-Time (JIT) access provisioning (marks of Microsoft Corporation).

In some embodiments, a customer global admin is involved in a one-time process of setting up assistant tenant AOBO artifacts such as X-TAP and Inbound Conditional Access. In some embodiments, AOBO artifacts specific to a managed service 416 will be enabled each time an admin authorizes a managed service involving SCTA.

Some embodiments provide or utilize enhancements around security, auditing, and integration with a case management system to make the solution robust and secure, and to increase usability. Some embodiments fill gaps by providing one or more of: a one-stop solution for technicians where they can request JIT access from a Case Management system; audit trails that correlate JIT requests and approval with technicians sign-in logs in customer tenant, and with audit logs showing changes in the customer tenant; a tracking system to notify technicians if any attacker or customer admin has altered the existing CA policy or created a stricter CA policy, potentially blocking technicians from login into the customer tenant; a tracking system to notify a customer admin if any technician-operated services have created Cross tenant role assignments other than what is contracted between the assistant tenant's supervisory admin or technician and the managed service customer.

The FIG. 5 diagram involves two tenants shown with vertical lanes, an assistant tenant and a focus tenant, and three phases of AOBO shown horizontally, but steps can also be divided differently. An alternate division into phases has four phases of AOBO: onboarding 524, accessing 526, access expiry (not shown in FIG. 5), and offboarding 528. Onboarding 524 and offboarding 528 involve one-time settings triggered by a customer or other focus tenant global admin.

During an onboarding phase 524 in some embodiments, the customer's global admin onboards 502 a managed service and creates X-TAP and inbound conditional access in their tenant 212. Followed by this the AOBO service 508 creates 504 security groups in the assistant tenant and sets up 512 a cross tenant role assignment in the customer tenant. In some cases, security groups are defined by role per customer, e.g., for a role of security admin and a customer Contoso, a group contoso_securityadmin is created. In some cases, set up 512 includes configuring an XTAP setting to allow service provider. In some embodiments, in order to allow JIT access to these security groups, ELM packages 530 are configured 510 in the assistant tenant. An ELM package provisions policy that provides time-bound access to the groups and requires an approver (based on the role) to approve the request.

During an on-demand access phase 526 in some embodiments, technicians go to the assistant tenant's myaccess portal or a similar portal and select a package to access. The access request 432 goes through an approval flow, resulting in a response 516 which approves or disapproves the request. After approval, technicians are granted access to the customer tenant.

During an access expiry phase in some embodiments, based on the ELM policy configuration, a technician's membership in the security group is removed. In FIG. 5, this is part of the offboarding phase.

During an offboarding phase 528 in some embodiments, the customer's global admin has the option of unsubscribing from a managed service. Then the X-TAP is de-activated and cross tenant role assignments are deleted. The customer admin is also advised to remove the X-TAP and inbound CA from their tenant 212. In some embodiments, offboarding 520 includes deleting access packages and deleting security groups. In some embodiments, offboarding 522 includes configuring the XTAP setting to not allow service provider, and deleting the cross tenant role assignment.

Some embodiments provide policy monitoring. Conditional access policies are monitored, so that if an altered policy or a stricter policy is detected in the customer tenant a notification is sent to assistant tenant technicians and they can accordingly collaborate with the customer's admin to resolve the issue.

Some embodiments provide role tracking. Cross tenant role assignments are tracked, so that the system doesn't violate the contract by creating more role assignments than contracted to between the assistant tenant vendor and the customer.

Some embodiments provide reporting to track AOBO activities using correlated audit logs. Some provide a correlated set of audit logs to track AOBO request and approval audit log in managed service, and to track activity in the customer tenant.

Some embodiments provide or utilize a cybersecurity method, including: receiving an approval of a time-bound zero standing access by an external user to an access-controlled resource of a cloud tenant, the external user not previously a user of the cloud tenant; provisioning a time-bound cross tenant role assignment for the external user in the cloud tenant; restricting the approved access to access from a secured restricted enrolled device; auditing actions of the external user within the cloud tenant during the duration of the approved access; and monitoring a conditional access policy of the cloud tenant during the duration of the approved access, and alerting in the event of an attempt to change the conditional access policy when the change would hinder the approved access.

Some embodiments include monitoring a conditional access policy of the cloud tenant during the duration of the approved access, and alerting in the event of an attempt to change the conditional access policy when the change would hinder the approved access.

Some embodiments include monitoring a cross tenant role assignment of the cloud tenant during the duration of the approved access, and alerting in the event of an attempt to change the role assignment when the change would hinder the approved access.

Some embodiments include correlation of auditing actions of the external user within the cloud tenant and actions such as the JIT request, approval, and activity during the duration of the approved access.

Some environments include a flow for AOBO access in customer tenants for managed services. In some, customer onboarding of AOBO includes these computing system steps or states in the listed sequence: software performing customer admin initiated onboarding starts, gets allowed AAD roles for a managed service, gets customer admin consent to roles, creates XTAP in customer tenant with admin token, creates a CA policy 1 in customer tenant with admin token (policy 1 blocks devices outside of a cloud PC virtual network IP range), creates CA policy 2 in customer tenant with admin token (policy 2 allows compliant managed (e.g., Windows 365® managed) devices from a certain IP range (mark of Microsoft Corporation). This customer onboarding of AOBO is followed by a background onboarding process which includes these steps or states in the listed sequence: onboarding API call, XTAP locked, security groups created in assistant tenant per customer and per role and per managed service, cross tenant role assignment in customer tenant, AAD entitlement packages created in assistant tenant per security group.

Some environments include a background CA consistency checker which runs, e.g., every hour or at another specified interval. In some, CA policy consistency checking 702 includes these computing system steps or states in the listed sequence: get baseline CA policies, get cross tenant access policy in customer tenant, compare CA policies and what-if analysis, when a CA policy change validation result indicates a pass then mark the payload as validated, or when a CA policy change validation result indicates a fail then call an ICM connector API and an ICM is created and investigation starts, e.g., with the customer admin. ICM is an Intelligent Communications Manager, which is used in some environments as an incident management service and internal tracking tool.

Some environments include a background role assignment consistency checker which runs, e.g., every hour or at another specified interval. In some, cross tenant role assignment consistency checking 704 includes these computing system steps or states in the listed sequence: get customer admin consented role assignments, get cross tenant role assignments from the customer tenant, compare role assignments, when a role assignment validation result indicates a pass then mark the payload as validated, or when a role assignment validation result indicates a fail then call an ICM connector API and an ICM is created and an investigation starts.

Some environments include a customer offboarding of AOBO that includes these computing system steps or states in the listed sequence: find all AOBO related artifacts in the customer tenant, find all AOBO related artifacts in the assistant tenant, mark XTAP for soft delete, mark cross tenant role assignment for soft delete, mark CA policies for soft delete, mark SCTA security groups in assistant tenant for soft delete, and mark SCTA entitlement access packages in assistant tenant for soft delete. Variations alter the marking order, or include concurrent marking, or both.

Some environments include a background offboarding phase after the customer offboarding of AOBO. This background offboarding includes these computing system steps or states in the listed sequence: disable XTAP in customer tenant, delete cross tenant role assignment in customer tenant, delete SCTA security groups in assistant tenant, delete SCTA entitlement access packages in assistant tenant, notify customer admin by email or otherwise to delete CA policies.

Some environments include a process for auto access with a reader role, which includes these computing system steps or states in the listed sequence: a case is assigned to a SOC (security operations center), find customer consented AAD reader role for the managed service, find correct entitlement access package for the AAD role in the assistant tenant, request access on behalf of the SOC, request is auto approved, poll entitlement management API to get time left for access.

Some environments include a process to request access for higher privileged roles, which includes these computing system steps or states in the listed sequence: SOC requests for a specific role in the customer tenant, process ends if request is denied otherwise case is assigned to SOC user, find correct entitlement access package for the AAD role in the assistant tenant, request access on behalf of the SOC and perform audit flow described below, pass control to AAD entitlement management logic app, send notifications to approver group and case management system, and pass control to approver flow.

In the approver flow, an approver receives notification over a communication platform, e.g., Microsoft Teams® platform (mark of Microsoft Corporation), or a case management system, and then approves or denies the access request, in a response notification via the platform or case management system or both. The request and response are logged by the system for auditing.

In a requestor customer tenant access flow, the requestor (e.g., SOC), receives notification. If access is approved, the requestor logs into the customer tenant and the computing system performs actions on different resources in the customer tenant, e.g., via a System for Cross-Domain Identity Management (SCIM), and then the customer tenant access flow ends. The actions are logged by the system for auditing.

Some environments include an audit log access process, which includes these computing system steps or states in the listed sequence. In one path, in which a customer views correlated 314 audit logs, software operating on behalf of a customer admin performs a role-based access control (RBAC) check, filters logs by customer ID and date, and feeds the result to a correlation query engine. In another path, software operating on behalf of a managed service admin performs a managed service RBAC check, filters logs by managed service and date, and feeds the result to the correlation query engine. The correlation query engine feeds a centralized audit storage, which also receives optionally audit enriched log data from activities in the focus tenant and the assistant tenant.

In some embodiments, the system 202 is an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as creating 504 security group data structures 326, creating 510 access entitlement package data structures 530, setting up 512 cross tenant role assignments 408, and constraining 712 access based on IP address 440 or managed device 426 status, which are each an activity deeply rooted in computing technology. Some of the technical mechanisms discussed include, e.g., software 216 to monitor access policies 138 and track roles 134, audit 130 correlation subsystems 316, case management subsystems 312, and scenario analysis subsystems 324. Some of the technical effects discussed include, e.g., detection 602 of cross-tenant access hampering changes or additions in conditional access policies 402, detection of cross-tenant access hampering changes in role assignments 408, detection 706 of rogue roles 414, 134, and correlation 314 of activities in a focus tenant 212 with activities in an assistant tenant 214. Thus, purely mental processes and activities limited to pen-and-paper are clearly excluded. Other advantages based on the technical characteristics of the teachings will also be apparent to one of skill from the description provided.

One of skill understands that a cross-tenant access activity in a cloud computing environment is a technical activity which cannot be performed mentally, because it requires computing system activities in a focus tenant 212 or activities in an assistant tenant 214, or both. This includes, for example, creating, reading, modifying, or deleting data structures 402, 408, 326, in computer system memory. Moreover, mental or pen-and-paper activity cannot configure a computing system to perform secure cross-tenant access as described herein. One of skill also understands that attempting to perform secure cross-tenant access only manually would create unacceptable delays in program execution, and would introduce a severe risk of human errors that can cause programs to crash or expose system to serious security risks, for example. People manifestly lack the speed, accuracy, memory capacity, and specific processing capabilities required to perform secure cross-tenant access as described herein.

In particular, secure cross-tenant access as described herein is a part of computing technology. Hence, the secure cross-tenant access improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as an access control identify service 506 within a set of cybersecurity controls, a security or managed service case management tool 312, or an audit tool 316.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to improve the security of cross-tenant access, how to detect unauthorized activities during cross-tenant access, and how to detect unauthorized roles during cross-tenant access. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

ADDITIONAL COMBINATIONS AND VARIATIONS

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

AAD: Azure® Active Directory® (marks of Microsoft Corporation)
ALU: arithmetic and logic unit
AOBO: action on behalf of, a.k.a. administrate on behalf of
API: application program interface
BIOS: basic input/output system
CA: conditional access
CD: compact disc
CPU: central processing unit
DVD: digital versatile disk or digital video disc
ELM: AAD Entitlement Management
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
JIT: just in time
LAN: local area network MEM: Microsoft Endpoint Manager
MSE: Microsoft Experts
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network
XTAP: cross tenant access policy Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user"

accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. SCTA operations such as reading or modifying identity provider 506 entries, analyzing 322 policies 138 for access hampering 310 impact, and many other operations discussed herein (whether recited in the Figures or not), are understood to be inherently digital. A human mind cannot interface directly with a CPU or other processor, or with RAM or other digital storage, to read and write the necessary data to perform the SCTA steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, adding, alerting, analyzing, auditing, checking, comparing, constraining, correlating, creating, deleting, detecting, executing, improving, inspecting, investigating, mitigating, modifying, monitoring, offboarding, onboarding, performing, receiving, requesting, responding, setting up, tracking, using (and accesses, accessed, adds, added, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"
104 users, e.g., user of an enhanced system 202
106 peripheral device
108 network generally, including, e.g., LANs, WANs, software-defined networks, clouds, and other wired or wireless networks
110 processor or set of processors; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102; data structures, values, source code, and other examples are discussed herein
120 kernel(s), e.g., operating system(s), BIOS, UEFI, device drivers; also refers to an execution engine such as a language runtime
122 software tools, software applications, security controls; computational
124 tenant in a multi-tenant cloud computing environment; a collection of computational resources at a level between individual users and the cloud overall
126 display screens, also referred to as "displays"
128 computing hardware not otherwise associated with a reference number 106, 108, 110, 112, 114
130 audit, as represented in a computing system; 130 refers to logs which hold audit events 132 and to the computational activity of creating, maintaining, or analyzing such logged events
132 computational event, as represented in a computing system log
134 user role, as represented in a computing system
136 cloud, also referred to as cloud environment or cloud computing environment
138 access policy, as represented in a computing system
202 enhanced computing system, i.e., system 102 enhanced with functionality 204 as taught herein
204 secure cross-tenant access functionality (also referred to as "SCTA functionality"), e.g., software or specialized hardware which performs or is configured to perform steps 302 and 602, or steps 304 and 602, or steps 302 and 304 and 602, or steps 602 and 604, or steps 602 and 306, or any software or hardware which performs or is configured to perform a novel method 700 or a computational cross-tenant access securing activity first disclosed herein, or a computational cross-tenant access activity first disclosed herein
206 computationally secure an access, also refers to security as a characteristic of a computing system, and to security measures
208 cross-tenant (a.k.a. "cross tenant"), i.e., from or on behalf of one tenant to or on behalf of another tenant
210 access in or to a computing system; refers to a computational activity or to an instance of the computational activity, or both, per context
212 focus tenant 124 in a cloud computing environment
214 assistant tenant 124 in a cloud computing environment; it is possible in some cases for a given tenant to be a focus tenant in one scenario and also be an assistant tenant in another scenario
216 SCTA components in a computing system, e.g., services 506, 508, and other software which provides functionality 204 upon execution, data structures such as 134, 138, 326, 402, 408, 430, 506, 530 which support or implement functionality 204, flows 524, 526, 528 which support or implement functionality 204
302 computationally monitor a policy 138, e.g., by polling, by a callback or hook on a routine configured to access policies 138, by scanning a log for events corresponding to policy access, or via a policy management API
304 computationally track a role 134, e.g., by polling, by a callback or hook on a routine configured to access roles 134, by scanning a log for events corresponding to role access, or via a role management API
306 computationally alert, e.g., by sending an email or text message, by modifying a GUI, or both
308 computing system access which is authorized in a given scenario
310 computationally hamper an authorized access; an identified threat to authorized access scope is also a hampering, and a circumstance in which reduction of authorized access scope is more likely than not is also a hampering
312 case management subsystem of a computing system; also referred to as a case management system or tool
314 computationally correlate events from logs of different tenants, also referred to as producing a correlated audit
316 audit correlation subsystem of a computing system; also referred to as an audit correlation system or tool
318 computing system role 134 which is authorized in a given scenario
320 list (not necessarily ordered) of authorized roles; digital
322 computationally analyze a role change or a policy change or both, to determine whether hampering 310 is implicated; 322 also refers to a digital result of such computational activity; in some embodiments includes an adaptation of what-if analysis
324 scenario analysis subsystem of a computing system; also referred to as a scenario analysis system or tool
326 security group data structure, also referred to as security group, in a computing system
328 interface generally in a computing system; computational, digital
402 conditional access policy in a computing system
404 scope of a policy in a computing system, e.g., which activities are allowed or barred
406 user computational activity in general; human behavior per se is excluded
408 cross tenant role assignment in a computing system
410 security command in a computing system
412 command in a computing system
414 rogue (unauthorized) role 134
416 managed service in a computing system
418 managed service command in a computing system
420 zero standing characteristic of an access session, as opposed to standing access which does not involve a fresh request for each access session
422 time bound characteristic of an access session, as opposed to perpetual or unlimited time which does automatically expire an access session after a specified time elapses
424 access session (a.k.a. access) which is zero standing or time bound or both
426 managed device 101, as opposed to a device not managed;

managed devices are managed, e.g., with regard to which software they contain, which security controls they are subject to, and auditing 428 granular delegated administrative privileges (GDAP) characteristic of a security group 430 GDAP or DAP group in a computing system 432 access request; computational activity or data structure 436 access scope, as represented in a computing system 438 resource in a computing system, e.g., hardware, software, data; excludes living creatures or ideas 440 IP address, as represented in a computing system 442 range or other set of one or more IP addresses, as represented in a computing system 444 change in a policy 138 or role 134, as represented in a computing system; content modification, priority modification, and content deletion are each examples of change 446 addition of a policy 138 or role 134, as represented in a computing system 500 data flow diagram; system architecture consistent with FIG. 5 data flow diagram 502 computationally onboard a managed service 504 computationally create a security group 506 directory service, also referred to as identity service, e.g., Azure® Active Directory® service (marks of Microsoft Corporation) or an LDAP (lightweight directory access protocol) service 508 AOBO (i.e., action on behalf of, a.k.a. administrate on behalf of) service 510 computationally create access entitlement package or other access entitlement or enablement data structure 512 computationally set up a cross tenant role assignment 514 access entitlement or enablement service 516 access request response data structure or computational activity 518 computationally add a user to a security group 520 computationally offboard cross tenant access in assistant tenant 522 computationally offboard cross tenant access in focus tenant 524 cross tenant access onboarding phase 526 cross tenant access focus tenant resource accessing phase 528 cross tenant access offboarding phase 530 access entitlement package or other access entitlement or enablement data structure 600 flowchart; 600 also refers to cross tenant access methods that are illustrated by or consistent with the FIG. 6 flowchart or any variation of the FIG. 6 flowchart described herein 602 computationally detect hampering 310 or another impact or likely impact of a change or addition to access policy 138 or role assignment 408 in a computing system, e.g., by detecting removal or scope reduction of an access token, access duration, or access permission, or by detecting a role 414 that is not in a list 320 of authorized roles 604 computationally modify an access policy 138, a role assignment 408, or another aspect of cross tenant access scope 436, e.g., access duration 700 flowchart; 700 also refers to cross tenant access methods that are illustrated by or consistent with the FIG. 7 flowchart, which incorporates the FIG. 5 data flow diagram and the FIG. 6 flowchart and other steps taught herein, or methods that are illustrated by or consistent with any variation of the FIG. 7 flowchart described herein 702 computationally check for a change or addition to access policy(ies) 138, e.g., based on an access timestamp, historic and current policy hash comparison, or other mechanism 704 computationally inspect a role assignment 408, e.g., via an API 706 computationally detect a rogue role 414 that is not in a list 320 of authorized roles 708 computationally receive a command 412, e.g., via a user interface API or other API 710 computationally execute a command 412, e.g., via a kernel 120, tool 122, or other software 712 computationally constrain an authorized access, e.g., by denying or terminating access when a constraint is not met, such as a IP address or managed device or access duration constraint 714 computationally use a security group, e.g., to constrain access 716 computationally use a GDAP group, e.g., to constrain access 718 computationally mitigate a security vulnerability, e.g., by reducing an attack surface, repairing damage done from an attack, adding an additional layer of defense against attack, or closing a security gap 720 computationally investigate a security vulnerability, e.g., by analyzing a log, or checking for vulnerability indicia in a computing system 722 computationally receive an access request, e.g., via a user interface API or other API 724 computationally perform activity in a tenant 726 computationally improve security of a tenant, e.g., by mitigating 718 a security vulnerability, or by reducing an attack surface regardless of any particular known vulnerability, or by increasing authentication requirements for access to tenant resources 728 any step or item discussed in the present disclosure that has not been assigned some other reference numeral; 728 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments in a cloud computing environment 100 include monitoring 302 conditional access policies 402 for changes 444 or additions 446 that hamper 310 or threaten to hamper an authorized access 308 from an assistant tenant 214 user to a focus tenant 212 resource. In some embodiments, cross-tenant access security 700 includes tracking 304 a role assignment list 320 to detect 706 rogue roles 414, or to detect 602 hampering role changes 444 such as role deletions, or both. In some embodiments, focus tenant events 132 and assistant tenant events 132 are correlated 314 in an audit 130. In some embodiments, the authorized access 308 is a zero standing time bound access 424. In some embodiments, the authorized access 308 is constrained 712 to an IP address range 442, or constrained 712 to login from a managed device 426, or both. In short, security measures 206, 216, 500, 700 are described that mitigate 726 accidental or surreptitious role or policy changes that would shut down or hinder authorized cross-tenant access 308.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity method for secure cross-tenant access, the method comprising:
   monitoring a non-hampering conditional access policy of a focus tenant, the monitoring comprising checking for a hampering change in the non-hampering conditional access policy, the monitoring also comprising checking for an addition of a hampering conditional access policy, wherein the hampering change is a change which hampers an authorized access to the focus tenant from an assistant tenant, the hampering conditional access policy is a conditional access policy which hampers the authorized access to the focus tenant from the assistant tenant;
   tracking a cross tenant role assignment of the focus tenant, the tracking comprising inspecting the cross tenant role assignment for a change in the cross tenant role assignment;
   detecting at least one of: the hampering change in the non-hampering conditional access policy, the addition of the hampering conditional access policy, or the change in the cross tenant role assignment; and
   modifying at least one of the following in response to a result of the detecting: the non-hampering conditional access policy, the hampering conditional access policy, the cross tenant role assignment, or a scope of the authorized access to the focus tenant from the assistant tenant.

2. The method of claim 1, further comprising correlating a focus tenant audit with an assistant tenant audit, thereby producing a correlated audit of activity of a user in the focus tenant and activity of the user in the assistant tenant.

3. The method of claim 1, further comprising receiving in the focus tenant a command from a user, wherein the command is in at least one of the following command categories: security investigation commands, security modification commands, or managed service commands.

4. The method of claim 1, wherein monitoring the non-hampering conditional access policy comprises performing a scenario analysis.

5. The method of claim 1, wherein tracking the cross tenant role assignment comprises detecting a rogue role.

6. The method of claim 1, further comprising constraining the authorized access to the focus tenant from the assistant tenant to be a zero standing time bound access.

7. The method of claim 1, further comprising constraining the authorized access to the focus tenant from the assistant tenant to be access only via login from an authorized managed device.

8. The method of claim 1, further comprising constraining the authorized access to the focus tenant from the assistant tenant to be access only via login from a specific IP address range.

9. The method of claim 1, further comprising defining the cross tenant role assignment in the focus tenant using at least a granular delegated administrative privileges group.

10. A computing system configured for secure cross-tenant access, the system comprising:
    a digital memory;
    a processor set comprising at least one processor, the processor set in operable communication with the digital memory, the processor set configured to execute a secure cross-tenant access method which comprises at least one of:
    detecting a conditional access policy hampering change and alerting in response to said conditional access policy hampering change detection,
    detecting a hampering conditional access policy addition and alerting in response to said hampering conditional access policy addition detection, or
    detecting a cross tenant role assignment hampering change and alerting in response to said cross tenant role assignment hampering change detection,
    wherein the conditional access policy hampering change is a change which hampers an authorized access to a focus tenant from an assistant tenant,
    the hampering conditional access policy addition is an addition of a conditional access policy which hampers the authorized access to the focus tenant from the assistant tenant, and
    the cross tenant role assignment hampering change is a change which hampers the authorized access to the focus tenant from the assistant tenant.

11. The computing system of claim 10, further comprising a case management subsystem which resides in the assistant tenant and comprises an interface configured to receive a request for the authorized access to the focus tenant.

12. The computing system of claim 10, further comprising an audit correlation subsystem which is configured to upon execution correlate an assistant tenant request for the authorized access to the focus tenant with a focus tenant sign-in event and with a focus tenant resource access event.

13. The computing system of claim 10, wherein a list of authorized roles resides in the digital memory, and wherein detection of a cross tenant role assignment hampering change comprises detection of a different role which is not in the list of authorized roles.

14. The computing system of claim 10, further comprising a security group which resides in the assistant tenant and corresponds to a non-hampering cross tenant role assignment in the focus tenant.

15. The computing system of claim 10, further comprising a scenario analysis subsystem which is configured to upon execution perform a scenario analysis based on at least a conditional access policy scope and an authorized access scope of the authorized access to the focus tenant.

16. A computer-readable storage device configured with data and instructions which upon execution by a processor cause a computing system to perform a secure cross-tenant access method, the method comprising at least one of:

alerting in response to a detection of a conditional access policy hampering change, alerting in response to a detection of a hampering conditional access policy addition, or alerting in response to a detection of a cross tenant role assignment hampering change, wherein the conditional access policy hampering change is a change which hampers an authorized access to a focus tenant from an assistant tenant, the hampering conditional access policy addition is an addition of a conditional access policy which hampers the authorized access to the focus tenant from the assistant tenant, and the cross tenant role assignment hampering change is a change which hampers the authorized access to the focus tenant from the assistant tenant.

17. The computer-readable storage device of claim 16, wherein the method further comprises correlating a focus tenant audit with an assistant tenant audit, thereby producing a correlated audit of activity of a user in the focus tenant and activity of the user in the assistant tenant.

18. The computer-readable storage device of claim 16, wherein the method further comprises constraining the authorized access to the focus tenant from the assistant tenant to be a zero standing time bound access via login from an authorized managed device.

19. The computer-readable storage device of claim 16, wherein the method further comprises constraining the authorized access to the focus tenant from the assistant tenant to be a zero standing time bound access via login from a specific IP address range.

20. The computer-readable storage device of claim 16, wherein the method further comprises constraining the authorized access to the focus tenant from the assistant tenant to be access only via login from an authorized managed device and from a specific IP address range.

* * * * *